US011566115B2

(12) United States Patent
Deravi et al.

(10) Patent No.: US 11,566,115 B2
(45) Date of Patent: Jan. 31, 2023

(54) BIOLOGICALLY-INSPIRED COMPOSITIONS THAT ENABLE VISIBLE THROUGH INFRARED COLOR CHANGING COMPOSITIONS

(71) Applicants: Northeastern University, Boston, MA (US); U.S. Govt. as Represented by the Sec. of the Army, Natick, MA (US)

(72) Inventors: Leila Deravi, Cambridge, MA (US); Camille A. Martin, Boston, MA (US); Amrita Kumar, Cambridge, MA (US); Richard M. Osgood, III, Winchester, MA (US)

(73) Assignees: Northeastern University, Boston, MA (US); US Government as Represented by the Secretary of the Army, Natick, MA (US)

( * ) Notice: Subject to any disclaimer, the term of this patent is extended or adjusted under 35 U.S.C. 154(b) by 0 days.

(21) Appl. No.: 16/141,758

(22) Filed: Sep. 25, 2018

(65) Prior Publication Data
US 2019/0100634 A1    Apr. 4, 2019

Related U.S. Application Data

(60) Provisional application No. 62/563,017, filed on Sep. 25, 2017, provisional application No. 62/627,709, (Continued)

(51) Int. Cl.
*C08J 5/04*  (2006.01)
*C08K 5/00*  (2006.01)
(Continued)

(52) U.S. Cl.
CPC ............ *C08J 5/046* (2013.01); *B32B 27/00* (2013.01); *C08J 5/18* (2013.01); *C08K 3/22* (2013.01);
(Continued)

(58) Field of Classification Search
CPC . C08J 5/046; C08J 5/18; C08J 2367/00; C08J 2377/00; C08J 2375/04;
(Continued)

(56) References Cited

U.S. PATENT DOCUMENTS 2,890,621 A    6/1959  Suits
3,668,172 A *  6/1972  Jones ................ C08J 3/226
                                                    524/106

(Continued)

FOREIGN PATENT DOCUMENTS

EP    0536955 A2    4/1993
EP    1038516 A1 *  9/2000    ............ A61K 8/44
(Continued)

OTHER PUBLICATIONS

Anna Nowakowska-Oleksy Jadwiga Soloducho, Phenoxazine Based Units—Synthesis, Photophysics and Electrochemistry, J Fluoresc (2011) 21:169-178 (Year: 2011).*

(Continued)

*Primary Examiner* — Bijan Ahvazi
(74) *Attorney, Agent, or Firm* — Hamilton, Brook, Smith & Reynolds, P.C.

(57) ABSTRACT

Biologically-inspired compositions, including color changing compositions, and corresponding embodiments such as sensors, textile materials, coatings and films, are provided which typically include a solid, transparent and nondegradable matrix. The matrix contains a plurality of (i) synthetic particles having a size in the micrometer or nanometer range, each synthetic particle including one or more aggregates of a pigment selected from phenoxazone, phenoxazine, and a derivate or precursor thereof, and a stabilizing material which has a refractive index larger than 1.45, the aggregates (Continued)

having a size larger than about 100 nm; or (ii) submicrometer natural particles extracted and purified from homogenized tissue.

18 Claims, 9 Drawing Sheets

Related U.S. Application Data filed on Feb. 7, 2018, provisional application No. 62/627,710, filed on Feb. 7, 2018, provisional application No. 62/627,717, filed on Feb. 7, 2018, provisional application No. 62/669,369, filed on May 9, 2018.

(51) Int. Cl.

| | | |
|---|---|---|
| C09K 9/02 | (2006.01) | |
| C08J 5/18 | (2006.01) | |
| C08K 3/36 | (2006.01) | |
| C08K 3/22 | (2006.01) | |
| C08K 5/357 | (2006.01) | |
| B32B 27/00 | (2006.01) | |

(52) U.S. Cl.
CPC ............ C08K 3/36 (2013.01); C08K 5/0041 (2013.01); C08K 5/357 (2013.01); C09K 9/02 (2013.01); C08J 2323/06 (2013.01); C08J 2367/00 (2013.01); C08J 2375/04 (2013.01); C08J 2377/00 (2013.01); C08J 2425/06 (2013.01); C08K 2003/2241 (2013.01); C08K 2003/2265 (2013.01)

(58) Field of Classification Search
CPC ............ C08J 2223/06; C08J 2425/06; C08K 5/0041; C08K 3/22; C08K 3/36; C08K 5/357; C08K 2003/2265; C08K 2003/2241; C07K 7/06; C07K 7/08; C07K 14/461; C09K 9/02; G02B 1/04; A61K 8/64; A61K 47/42; A61Q 19/00; A23L 1/2756

See application file for complete search history.

(56) References Cited

U.S. PATENT DOCUMENTS

| | | | | |
|---|---|---|---|---|
| 3,899,346 | A * | 8/1975 | Ferrigno | C09C 1/28 |
| | | | | 106/414 |
| 4,012,232 | A | 3/1977 | Uhlmann et al. | |
| 4,092,410 | A | 5/1978 | Ogata et al. | |
| 4,472,490 | A | 9/1984 | Yubakami et al. | |
| 4,855,144 | A | 8/1989 | Leong et al. | |
| 5,302,248 | A | 4/1994 | Weinstock et al. | |
| 5,552,445 | A | 9/1996 | Ohashi et al. | |
| 5,672,415 | A * | 9/1997 | Sawyer | D01F 8/06 |
| | | | | 428/219 |
| 5,804,639 | A | 9/1998 | Schöpwinkel et al. | |
| 6,645,280 | B1 | 11/2003 | Zhu et al. | |
| 6,648,957 | B1 | 11/2003 | Andes | |
| 6,825,975 | B2 | 11/2004 | Gallas | |
| 7,365,109 | B2 * | 4/2008 | Rathschlag | A61K 8/0225 |
| | | | | 523/171 |
| 8,026,326 | B2 * | 9/2011 | Benz | C07C 225/22 |
| | | | | 526/312 |
| 8,128,913 | B1 | 3/2012 | Roszell et al. | |
| 8,518,369 | B2 | 8/2013 | Ribeiro et al. | |
| 2001/0046990 | A1 | 11/2001 | Hjorth et al. | |
| 2004/0058458 | A1 | 3/2004 | Anker et al. | |
| 2005/0041299 | A1 * | 2/2005 | Gallas | G02B 5/223 |
| | | | | 359/642 |
| 2006/0051307 | A1 | 3/2006 | Gotou et al. | |
| 2007/0020216 | A1 | 1/2007 | Reinhart et al. | |
| 2007/0221884 | A1 | 9/2007 | Hoppe et al. | |
| 2008/0026221 | A1 * | 1/2008 | Vincent | C09D 11/322 |
| | | | | 428/407 |
| 2008/0206874 | A1 | 8/2008 | Manka | |
| 2009/0030108 | A1 * | 1/2009 | Ito | C08L 71/02 |
| | | | | 523/106 |
| 2009/0246674 | A1 | 10/2009 | Carlini | |
| 2009/0247406 | A1 | 10/2009 | De Corte et al. | |
| 2009/0311295 | A1 | 12/2009 | Mathiowitz et al. | |
| 2012/0164195 | A1 | 6/2012 | Zheng et al. | |
| 2015/0158911 | A1 * | 6/2015 | Parker | C07K 14/43504 |
| | | | | 514/773 |
| 2015/0329604 | A1 * | 11/2015 | Parker | C07K 14/435 |
| | | | | 424/401 |
| 2015/0346398 | A1 | 12/2015 | Gorodetsky et al. | |
| 2016/0374907 | A1 | 12/2016 | Balian et al. | |
| 2019/0099339 | A1 | 4/2019 | Deravi et al. | |

FOREIGN PATENT DOCUMENTS

| | | | | |
|---|---|---|---|---|
| EP | 1038516 A1 | 9/2000 | | |
| WO | 2005009604 | 2/2005 | | |
| WO | 2005019874 A2 | 3/2005 | | |
| WO | 2014/085641 A1 | 6/2014 | | |
| WO | 2017114877 A1 | 7/2017 | | |
| WO | WO-2017114877 A1 * | 7/2017 | ............ | A61Q 19/02 |
| WO | 2019060916 A2 | 3/2019 | | |
| WO | 2019139649 A2 | 7/2019 | | |
| WO | 2022081942 A1 | 4/2022 | | |

OTHER PUBLICATIONS

Thomas L. Williams, Christopher W. DiBona, Sean R. Dinneen, Stephanie F. Jones Labadie, Feixia Chu, and Leila F. Deravi, Contributions of Phenoxazone-Based Pigments to the Structure and Function of Nanostructured Granules in Squid Chromatophores, Langmuir 2016, 32, 3754-3759 (Year: 2016).*
Yuri P. Tsentalovich, Peter S. Sherin, Lyudmila V. Kopylova, Ivan V. Cherepanov, Jakob Grilj, and Eric Vauthey, Photochemical Properties of UV Filter Molecules of the Human Eye, Investigative Ophthalmology & Visual Science, Sep. 2011, vol. 52, No. 10, 7687-7696 (Year: 2011).*
DiBona, C. W., et al.; "A Method for Extracting Pigments from Squid Doryteuthis pealeii", J Vis Exp 2016, 117, e54803.
Williams, T. L., et al.; "Contributions of Phenoxazone-Based Pigments to the Structure and Function of Nanostructured Granules in Squid Chromatophores", Langmuir 2016, 32, 3754.
Dinneen, S. R., et al.; "Color Richness in Cephalopod Chromatophores Originating from High Refractive Index Biomolecules", J. Phys. Chem. Lett. 2017, 8, 313.
Osgood III, R. M., et al.; "Scattering of long wavelengths into thin silicon photovoltaic films by plasmonic silver nanoparticles", Proc. SPIE 9178, Next Generation Technologies for Solar Energy Conversion V 2014, 91780I.
Butenandt, A.; Schäfer, W., "Recent Progress in the Chemistry of Natural and Synthetic Coloring Matters and Related Fields", Academic Press, New York, pp. 13-33, 1962.
Braun, R. D., Introduction to Chemical Analysis, McGraw-Hill, Inc., pp. 197-199, 1982.
Son, Y. A.; Kim, S.-H., "New pH indicator based on 1,3-bisdicyanovinylindane", Dyes Pigm. 2005, 64, 153-155.
Balaji, A.B., et al., "Natural and synthetic biocompatible and biodegradable polymers", 31 pages (Jan. 2018).
Bolognese, A., et al., "Photochemistry of Ommochrome Pigments", Journal of Heterocyclic Chemistry, 4(25): 4 pgs, (Jul. 1, 1988).
Iwahashi, H., et al., "Detection of the oxidative products of 3-hydroxykynurenine using high-performance liquid chromatography-electrochemical detection-ultraviolet absorption detection-electron spin resonance spectrometry and high-performance liquid chromatography-electrochemical detection-ultraviolet absorption detection-mass spectrometry", Journal of Chromatography A, 773 (1997) 23-31.
Kumar, A., et al., "Natural Light-Scattering Nanoparticles Enable Visible through short-wave infrared color modulation", Adv. Optical Mater., 2018, 6, 1701369.

(56) References Cited

OTHER PUBLICATIONS

Li, J., et al., "Oxidation of 3-hydroxykynurenine to produce xanthommatin for eye pigmentation: a major branch pathway of tryptophan catabolism during pupal development in the Yellow Fever Mosquito, Aedes aegypti", Insect Biochemistry and Molecular Biology 29 (1999) 329-338.
Linzen, B., "The Tryptophan-Ommochrome Pathway in Insects", Elsevier Science & Technology, US, vol. 10, Jan. 1, 1974.
Notification of Transmittal of the International Search Report and the Written Opinion of the International Searching Authority, or the Declaration for International Application No. PCT/US2018/052739, "Cosmetic And Dermatological Compositions Based On Phenoxazone And Phenoxazine", dated Apr. 30, 2019.
Notification of Transmittal of the International Search Report and the Written Opinion of the International Searching Authority, or the Declaration for International Application No. PCT/US2018/052738, "Biologically-Inspired Compositions That Enable Visible Through Infrared Color Changing Compositions", date Aug. 16, 2019.
Tachikawa, T., et al., "Development of a Polymer Film Containing a Leuco-Phenoxazine Color Former for γ Ray Detection", Journal of Photopolymer Science and Technology, 18(1): 121-124 (2005).
Deravi, L.F., et al., "The structure—function relationships of a natural nanoscale photonic device in cuttlefish chromatophores", J.R. Co. Interface 11: 20130942, 9 pages (Jan. 7, 2014).
Halima, N.B., "Poly(vinyl alcohol): review of its promising applications and insights in biodegradation", RSC Adv., 2016 6: 39823-39832.
Hutchinson, M.H., et al., "Optical Properties of Polylactides", J Polym Environ (2006), 14: 119-124.
International Preliminary Report on Patentability for International Application No. PCT/US2018/052738, "Biologically-Inspired That Enable Visible Through Infrared Color Changing Compositions", dated Mar. 31, 2020.
International Preliminary Report on Patentability for International Application No. PCT/US2018/052739, "Cosmetic And Dermatological Compositions Based On Phenoxazone And Phenoxazine", dated Mar. 31, 2020.
Needham, A.E., "The significance of Zoochromes", 1974 Springer-Verlag: Berlin p. 63-64 (1974).
Non-Final Office Action for U.S. Appl. No. 16/141,690, "Cosmetic and Dermatological Compositions", dated Jan. 27, 2020.
Polyvinyl alcohol reference cameo.mfa.org/wiki/Polyvinyl_alcohol, 2 pages (2016).
Rahmanian, N., et al., "Characterisation of granule structure and strength made in a high shear granulator", Powder Technology, 192 (2009): 184-194.
Tsentalovich, Y.P., et al., "Photochemical Properties of UV Filter Molecules of the Human Eye", IVOS, Sep. 2011, 52(10): 7687-7696.
Final Office Action for U.S. Appl. No. 16/141,690, "Cosmetic and Dermatological Compositions", dated Jul. 24, 2020.
Hoyt, L.F., et al., "New Table of the Refractive Index of Pure Glycerol at 20° C.", Industrial and Engineering Chemistry, Mar. 1934, 329-332.
Non-Final Office Action for U.S. Appl. No. 16/141,690, "Cosmetic and Dermatological Compositions", dated Feb. 19, 2021.
Non-Final Office Action for U.S. Appl. No. 16/141,690, "Cosmetic and Dermatological Compositions", dated Jul. 27, 2021.
Deravi, L.F., et al., "Evaluation of Biologically Inspired Ammonium Xanthommatin as a Multifunctional Cosmetic Ingredient", JID Innovations 2022; 2:100081, 8 pages.
Final Office Action for U.S. Appl. No. 16/141,690, "Cosmetic and Dermatological Compositions", dated Jan. 26, 2022.
Gautier, C., et al., "Pigments based on silica-coated gold nanorods: Synthesis, colouring strength, functionalisation, extrusion, thermal stability and colour evolution", Gold Bulletin 2010; 43(2): 94-103.
Martin, C. A. et al., "A bioinspired, photostable UV-filter that protects mammalian cells against UV-induced cellular damage", Chemical Communication. 2019, vol. 55, issue 80, pp. 12036-12039.
Notice of Allowance for U.S. Appl. No. 16/141,690, "Cosmetic and Dermatological Compositions", dated May 11, 2022.
Tang, Y-Z, et al., 'Free-radical-scavenging effect of carbazole derivatives on AAP Hinduced hemolysis of human erythrocytes' Bioorganic and Medicinal Chemistry. 2007, vol. 15, issue 1, pp. 1903-1913.
Williams, T. L., et al.; "A Sustainable Route to Synthesize the Xanthommatin Biochrome via an Electro-catalyzed Oxidation of Tryptophan Metabolites", ACS Sustainable Chem. Eng., 2019, 7, 8979-8985.

\* cited by examiner

BIOLOGICALLY-INSPIRED COMPOSITIONS THAT ENABLE VISIBLE THROUGH INFRARED COLOR CHANGING COMPOSITIONS

RELATED APPLICATIONS

This application claims the benefit of U.S. Provisional Application No. 62/563,017, filed on Sep. 25, 2017, U.S. Provisional Application No. 62/627,709, filed on Feb. 7, 2018, U.S. Provisional Application No. 62/627,710, filed on Feb. 7, 2018, U.S. Provisional Application No. 62/627,717, filed on Feb. 7, 2018, and U.S. Provisional Application No. 62/669,369, filed on May 9, 2018. The entire teachings of the above applications are incorporated herein by reference.

GOVERNMENT SUPPORT

This invention was made with government support under Grant No. W911NF-16-1-0455 by the Army Research Office. The government has certain rights in the invention.

BACKGROUND

New surface coating products and processes that prevent pollution, safeguard the environment, and adhere to environmental laws and regulations (e.g., NESHAPs for Fabric Printing, Coating, and Dyeing) are necessary for developing coatings that meet performance requirements, such as those required by the previous Sustainable Painting Operations requirement, PP-1-02-04. Many products and ingredients currently used for organic surface coatings are not safe or healthy for consumers and everyday users, are under increasing ESOH regulatory scrutiny, have undetermined composition, and may have poorly-understood ESOH future challenges. Without innovative, sustainable technology, consumers continue to remain at risk. Thus, new materials and compositions that are safe for the environment and the user are needed.

SUMMARY

Compositions are provided which have a number of advantages, for example, they can provide the basis for coatings that are safe for the environment and user.

One embodiment is a composition comprising a solid, transparent and nondegradable matrix containing a plurality of (i) synthetic particles having a size in the micrometer or nanometer range, each synthetic particle including one or more aggregates of a pigment selected from phenoxazone, phenoxazine, and a derivative or precursor thereof, and a stabilizing material which has a refractive index larger than 1.45, the aggregates having a size larger than about 100 nm; or (ii) submicrometer natural particles extracted and purified from homogenized tissue.

A further embodiment is a sensor comprising a composition described herein, wherein the composition is positioned to allow physical contact with a sample.

Yet a further embodiment is a color-changing composition, comprising a composition described herein, where the color-changing composition changing its color in response to changes in pH, humidity, solar light, and/or presence of chemical or electrical oxidizing or reducing agents.

Yet a further embodiment is a textile material comprising a composition described herein.

Yet a further embodiment is a composition comprising a solid, transparent and nondegradable matrix containing (i) a free pigment selected from phenoxazone, phenoxazine, and a derivate or precursor thereof, and/or (ii) one or more aggregates of a pigment selected from phenoxazone, phenoxazine, and a derivative or precursor thereof, the free pigment and/or the aggregates being homogenously distributed throughout the matrix.

Yet a further embodiment is a coating comprising a composition described herein.

Yet a further embodiment is a film comprising a composition described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

As used herein, "polymer encapsulated" refers to a nano- or micro-particle which has an exterior polymer containing shell that is used to stabilize or encapsulate a material within the shell.

As used herein, "transparent" refers to a substance that does not substantially absorb or reflect light in the visible spectral regions (400-750 nm).

As used herein, "change of" or "changing" color refers to a spectral shift of at least 20 nm in the visible through mid-infrared color space.

The synthetic particles and compositions described herein have numerous commercial applications including as multifunctional colorants in the coating industries, as antioxidants, and as blue light filters.

In certain embodiments the compositions contain pigments (e.g., selected from a phenoxazone, phenoxazine, and a derivative or precursor thereof) which are UVA and UVB absorbers and the compositions can be used as sun-protectant products, alone or in combination with other compositions.

Pigments include, but are not limited to, pigments selected from phenoxazone, phenoxazine, and a derivate or precursor thereof, for example, 3-hydroxykynurenine, xanthommatin, decarboxylated xanthommatin, dihydroxanthommatin, rhodommatin, ommatin D, and ommins (e.g., ommin A). For example, the pigment can be xanthommatin or a derivative thereof. For example, a derivative of xanthommatin can be decarboxylated xanthommatin For example, the pigment can be ommin A or a derivative thereof.

A pigment suitable for the embodiments described herein, can also be an ommochrome represented by structural formulas (I), (II), (III) or (IV)

wherein R can be a proton donating or accepting group (including carboxylic acids or amines), a saturated or unsaturated functional group, another phenoxazine/phenoxazone moiety, or a combination of the above.

Both, xanthommatin and decarboxylated xanthommatin are highly conjugated organic molecules and have been identified in squid *Doryteuthis pealeii* chromatophore pigment granules. These pigments can be extracted from squid *Doryteuthis pealeii* chromatophores. Chromatophores are soft actuators that contain a network of nanostructured pigment granules of phenoxanone pigments. Squid *D. pealeii* pigments have a deep red color and contain combinations of xanthommatin and decarboxylated xanthommatin dyes. In suspension, these pigments have an intrinsic UV absorbance and ability to scatter light—both are characteristics that contribute to brightening and/or distorting visible and infrared color. Specifically, these pigments are UVA and UVB absorbers, which makes them suitable for sun-protectant compositions. They can also be used as natural colorants or camouflaging paints.

Suitable pigments can not only be extracted from cephalopods (e.g., squid *Doryteuthis pealeii* chromatophores), but also from other natural sources such as the eyes, integumentary system, organs, and eggs of arthropods. These pigments can also be synthesized using methods described herein or known in the art.

When the compositions are in the form of a coating, they can be designed to impart complex directional differences and other well-controlled optical properties depending on thickness of coating.

In certain embodiments, the compositions provided herein, can additionally contain colorants. Natural colorants, which are pigments that are derived from animal, vegetable or mineral sources, can also additionally be included in the compositions described herein.

In certain embodiments, the compositions provided herein, can further contain pigments other than those selected from phenoxazone, phenoxazine, and a derivate or precursor thereof. For example, animal derived pigments such as carmine (also called cochineal) can be included. Cochineal extract has a bright red color obtained from the aluminum salt of carminic acid. The characteristic deep red color is produced from some insects such as the cochineal scale and certain *Porphyrophora* species. Carmine is the only organic colorant exempt from certification by the US FDA. Inorganic oxides, such as iron oxides, (yellow, red, brown) can also be included, for example, in the development of color cosmetics.

The pigments, synthetic particles and compositions described herein, can absorb up to 90% visible light (350 to 600 nm) while scattering and/or reflecting between 20-60% infrared light (800-2500 nm) depending on particle distribution, where highest values (highest visible absorbers and largest IR scatterers) contain phenoxazone-based pigment particles assembled as films with ~12 μm thickness. These pigmented granules have been found to contribute to nano-enabled scattering throughout the visible, NIR, and SWIR regions with a brightness that is dependent on the thickness of the particle layer and/or by combining a back-reflector with a specific band pass.

The compositions described herein have numerous uses. For example, they can be used as IR coolants or camouflaging agents, e.g., for coatings (paints, films, textiles). Also, pigments encapsulated in synthetic particles can provide nano-enabled visible light scattering which can improve solar cell absorption, chemical sensors via the surface-enhanced Raman scattering mechanism, and infrared scattering.

A device comprising a fiber, textile material, coating or film described herein, wherein the fiber, textile material, coating or film is positioned onto or above a back-reflecting material.

Known effect pigments constructed from mica, a type of phyllosilicate mineral that consists of pseudohexagonal crystals can also be included. These minerals exhibit nearly perfect cleavage resulting in the formation of platelet particles of varying size. The typical platelet thickness ranges from 100-1000 nm and has the ability to show interference colors. In the production of pearlescent pigments, the optical layers are built upon the mica substrate by coating the surface with photoactive materials such as iron oxide pigments.

Other effect pigments can be constructed with transparent substrates with no visible color such as borosilicate and silica. Each of these substrates provides a range of optical properties that can deliver differentiated appearance and performance characteristics. Silica can be used as a substrate for effect pigments due to its tunable thickness, particle assembly and low refractive index (1.46) when compared to mica (1.58).

A significant difference between the refractive indices between the substrate and pigment contributes to reflected light. When films of different refractive indices are combined, multiple reflections result and stronger interference colors. This multilayer technique is demonstrated in nature and can be applied when designing new IR reflective compositions.

Pigment particle size is important in designing effect pigments. The classical light scattering mechanisms such as Rayleigh scattering, Mie scattering and large particle Mie scattering are particle size dependent. Small particles are very efficient at scattering shorter light wavelengths; nanoparticle scattering is highly dependent on wavelength with shorter wavelengths (ultraviolet or blue light) scattering more intensely than longer wavelengths (red light). A key example of this phenomenon is highlighted with the incorporation of titanium dioxide nanoparticles in sunscreen products; titanium dioxide nanoparticles are frequently used in sun protectant products due to their ability to scatter hazardous ultraviolet radiation and thus protects the skin from the penetration of harmful radiation. Large particle Mie scattering occurs when the particle is larger than incident wavelength of light; in this case scattering is not wavelength dependent. In large particle Mie scattering a forward directed antenna lobe projecting in the general direction of the incident light results. Effect pigments can be 10-20 microns, which is much larger than the wavelengths of interest (ultraviolet and visible light), therefore, large particle Mie scattering can be expected.

The multifunctionality of modified *D. pealeii* pigments is highlighted by its combinatorial UV through infrared absorption and light scattering capabilities.

Further embodiments are as follows:

The application of phenoxazone-based biopigments and their derivatives, including but not limited to 3-hydroxykynurenine, xanthommatin and ommatin D, as total solar protectants.

The application of natural or biologically inspired nano- or micro-particles incorporating phenoxazone-based pigments and polymeric and/or protein complexes as total solar protectants.

Bio-hybrid nano- or micro-particles incorporating phenoxazone-based pigments and metal-oxides (mineral based, or metal-derived) as total solar protectants.

Bio-hybrid nano- or micro-particles incorporating phenoxazone-based pigments and metal-oxides (mineral based, or metal-derived) as blue light filters.

A green/color changing pigment that provides both visible and infrared coloration with color tunability while minimizing EHOS risk.

An infrared reflective colorant encapsulated within a nanoparticle (diameter 400-600 nm) that is capable of absorbing visible light (350-600 nm), while scattering and reflecting infrared light (800-2500 nm).

EXAMPLES

Method for Stabilizing Pigments and Native Granules

Solutions of the phenoxazone-based pigments, pigments encapsulated within synthetic nanoparticles (e.g., silicon dioxide, titanium dioxide, and/or polymers including polyurethanes, polyesters, polyethylene glycol, or polymethacrylates), and/or native chromatophore pigment granules can be stabilized in a polyelectrolyte solution to produce, for example, uniformly casted thin films containing distributed particles and pigments.

Figure 1:
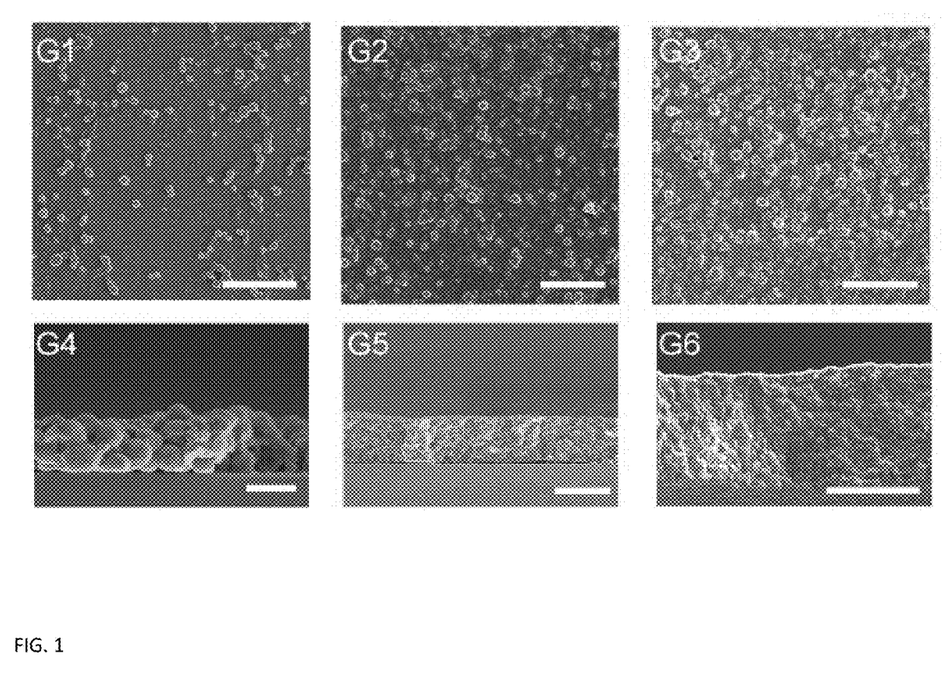
FIG. 1 provides top-down SEM images of granule films. G1-G3 granule films indicate the increased density of granules, even though they are still ~1 layer thick (scale bars are 5 µm). For multi-layer films G4-G6, representative cross-sectional SEM images show variations in thickness (scale for G4 is 1 µm; G5 is 5 µm, and G6 is 5 µm).

A suspension (0.16-2.45 mg/ml) of granules which were first isolated and purified from *D. pealeii* chromatophores was casted within a poly-acrylic acid (PAA) matrix onto glass slides. The positively charged PAA layer (~60 nm thick) was used to minimize crack formation in the films through electrostatic interactions with the granules (zeta potential =−10.6 mV) upon deposition. It is believed that the PAA layer also aided in stabilizing the pigment granules, producing a uniform film. In this configuration, the hybrid films (e.g. mimetic of the natural chromatophores) included granules embedded in the polymer layer producing a ~mm scale pigmented surface with varying hues. Pigment granule films stabilized in positively charged polymeric matrices have been formed (FIG. 1).

Light-Scattering Nanoparticles enable Visible through Short-wave Infrared Color Modulation Diffuse and specular scattering originating in materials made from nanoparticles that populate the chromatophore organs is shown. It is found that films as few as 2 particle layers thick (~1 μm) contribute to over 20% forward scattering in the visible, near-, and short-wave infrared (NIR-SWIR) regions. The intensity of scattered light across this broad spectrum increases when films or fibers containing these nanoparticles are placed above a back-reflecting material, suggesting a tunable feature that can be controlled under different conditions. This nano-enhanced visible through SWIR scattering may lead to better spectral purity of reflected and back-scattered light, illustrating an important role in color-changing materials.

Films comprised of a distribution of particles with multiple thicknesses were fabricated, including monolayer films (labeled as G1-G3) and multi-layer films (labeled as G4-G6). To achieve these different thicknesses, a suspension (0.16-2.45 mg/ml) of granules which were first isolated and purified from D. pealeii chromatophores was casted onto poly-acrylic acid (PAA)-coated glass slides. In this configuration, the hybrid films included granules embedded in the polymer layer producing a ~mm scale pigmented surface with varying hues. Scanning electron microscopy (SEM) indicated that the lighter colors (G1-G3) were comprised of ~1 granular layer thick with decreasing inter-granular spacing. The inter-granular distances for G1, G2 and G3 were 1.11±0.91 μm, 0.80±0.65 μm and 0.35±0.34 μm, respectively (N=50 particles, error is standard deviation). On the other hand, the denser films (G4-G6) all appeared to have similar inter-granular spacing (<1 μm), but their cross-sectional SEMs, and supporting profilometry measurements, indicated film thicknesses that increased from 1170±150 nm (G4) and 3880±150 nm (G5) to 5820±430 nm (G6), suggesting ~2, ~7, and ~12 granular layer thick films (FIG. 1).

To better understand the color quality and consistency observed from the G1-G6 films, their International Commission on Illumination (CIE) tristimulus values were measured using a 45° diffuse reflectance probe. Tristimulus values are meant to encompass human visual perception, which can be graphically illustrated within a xy-chromaticity diagram. Based on this metric, it was found that all pigment granule films were localized within the neutral/red regions, transitioning from a light, neutral color space (G1) to red/orange (G2-G4), then back to a darker but still neutral color space (G5-G6). While this data suggested that the films had some differences, the recorded color palette was limited and did not fully capture the diversity of colors displayed by the films. To account for these color differences, next the CIELAB coordinates, derived from the XYZ color space which provided extra variables that describe lightness, or color intensity, factor ($L^*$) and chroma ($C^*_{ab}$), or colorfulness relative to the white standard reference (WS-1), was analyzed. Here, $a^*$ (red-to-green), $b^*$ (yellow-to-blue), and $L^*$ values were measured using the CIE 1931 xy-chromaticity values normalized to the WS-1 reference as discussed in M. D. Fairchild, Color Appearance Models, 3rd Edition. *John Wiley & Sons* 2013, and the chroma was calculated as $C^*_{ab} = \sqrt{(a^*)^2 + (b^*)^2}$. Together, with saturation, which was defined as Saturation=$(C_{ab} \times 100\%)/\sqrt{(C^*_{ab})^2 + (L^*)^2}$, these values enabled better capture of the colors reflected from the granular films (see Table 1).

TABLE 1

The CIE 1976 color space for the pigment granule films, including calculated $C^*_{ab}$ and saturation values, as a function of thickness, determined by SEM cross-sectional imaging. The standard range for $L^*$ and saturation span 0-100%.

| Sample | L* | a* | b* | C*$_{ab}$ | Saturation | Thickness (nm) | Granule Layers |
|---|---|---|---|---|---|---|---|
| G1 | 75.2 | 1.7 | 2.4 | 2.9 | 3.8 | — | ~<1* |
| G2 | 45.2 | 4.1 | 4.8 | 6.3 | 13.9 | — | ~<1* |
| G3 | 43.3 | 16.3 | 9.8 | 19.1 | 40.2 | 530 ± 160 | ~1 |
| G4 | 42.9 | 14.6 | 7.4 | 18.1 | 38.8 | 1170 ± 150 | ~2 |
| G5 | 12.2 | 12.5 | 1.5 | 11.4 | 68.3 | 3880 ± 150 | ~7 |
| G6 | 7.6 | 8.5 | -0.1 | 6.2 | 63.2 | 5820 ± 430 | ~12 |
| WS-1 | 99.7 | 0.0 | 0.0 | 0.0 | 0.0 | — | — |

* at less than 1 monolayer, thickness of the granule film is not well-defined.

Figure 2:
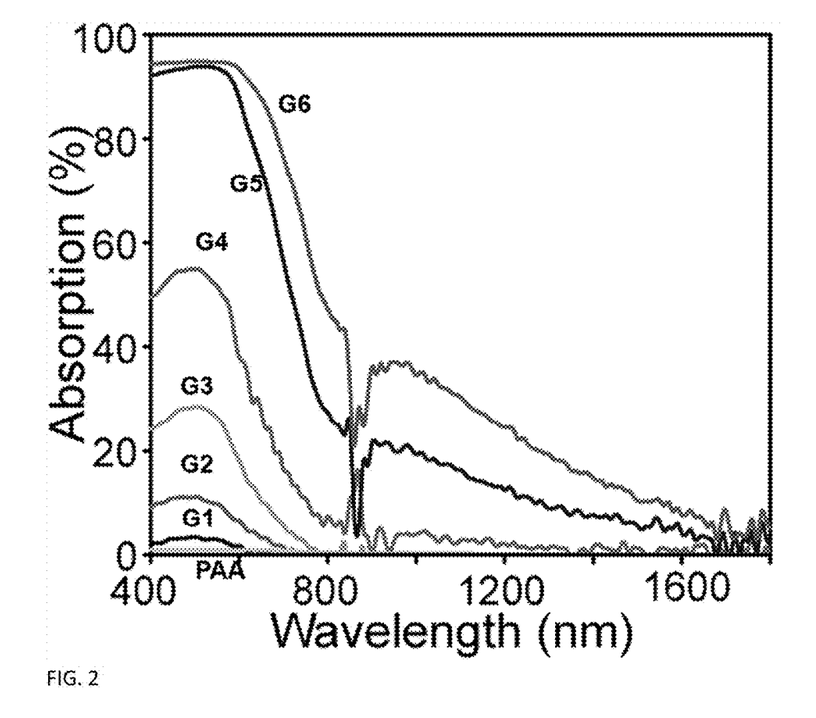
FIG. 2 provides a graph of the visible through short-wave infrared absorption of the films as a function of thickness, obtained using Total Integrated Diffuse Scattering (TIDS) of films presented in FIG. 1.

It was observed that the variations in visible color as a function of granule spacing and thickness differed from the G1 film (highest $L^*$) to the G6 film (lowest $L^*$). The $a^*$, $b^*$, and chroma values were maximized in the G3 and G4 films, indicating these films had the highest spectral purity (Table 1). Beyond this point, color was saturated and chroma decreased (G5 and G6 films). These saturated values also correlated well with the measured absorption, where maximum intensity was achieved from 400-600 nm for the G5 and G6 films (see FIG. 2). Collectively, these data indicated that both granule distribution and thickness contributed to a range of visible colors and hues within these biomimetic films.

While reflectance and absorption are standard spectroscopic techniques used to characterize color; they do not account for the complex scattering effects characteristic of nanostructured materials. In fact, the absorption in the visible can be overestimated as $A_{false} = 1 - R_{std} - T_{std}$ if one naively accounts only for specular reflectivity ($R_{std}$) and transmission ($T_{std}$) and assumes no scattering. The total integrated reflection ($R_{int}$) and transmission ($T_{int}$) should be used, where $A = 1 - R_{int} - T_{int}$. Even though this A is smaller, it results in a higher potential value for $L^*$ and a more colorful film.

When modeled as nanoparticles using Mie theory and finite difference time domain (FDTD) simulations, the pigments (refractive index (n)~1.92) were found to more likely scatter incident light than absorb it (S. R. Dinneen, R. M. Osgood III, M. E. Greenslade, L. F. Deravi, *J. Phys. Chem.*

*Lett.* 2017, 8, 313). To better understand the role of scattering from the perceived color in the mimetic films, the angle-integrated scattering was experimentally measured using total integrated diffuse spectroscopy (TIDS). First, the total integrated transmission (% $T_{int}$) and reflectivity (% $R_{int}$) for each film was measured, where a decrease in % $T_{int}$ at short wavelengths (<550 nm) with increasing the film thickness was observed, eventually leading to a minimal transmission of light through the saturated G5 and G6 films (see FIG. 3). At longer wavelengths (>550 nm), a sharp increase in transmitted light was observed, ultimately enabling ~85% of incident light to be transmitted in the SWIR region, even for the thickest films. The % $R_{int}$ measured for the films was less dramatic, remaining <9.0% for all conditions. Single layered samples (G1-G3) ranged from 6.5-9.0% of $R_{int}$ in the shorter wavelengths (<550 nm). However, the multi-layer granule films (G3-G6) exhibited a phase shift in their reflectance above 750 nm, where % $R_{int}$ increases by ~4% from the visible to the NIR and SWIR regions (see FIG. 3). While the % $R_{int}$ values were significantly less than the measured % $T_{int}$, it was found that the data correlated well with previous in situ measurements on expanded red chromatophores in the mantle region of *D. pealeii*, which similarly showed a phase shift at λ>550 nm approaching 5-8%. Combined, these data suggested an important role of the SWIR light which transmits more effectively through the films than the visible light. If one assumes a simplistic model of the optical constants as constants with respect to wavelength, using n=1.92+i0.014, then the primary transmission, not including forward scattering $S_f$, always increases considerably above around 800 nm because the penetration depth increases with wavelength.

Figure 3:
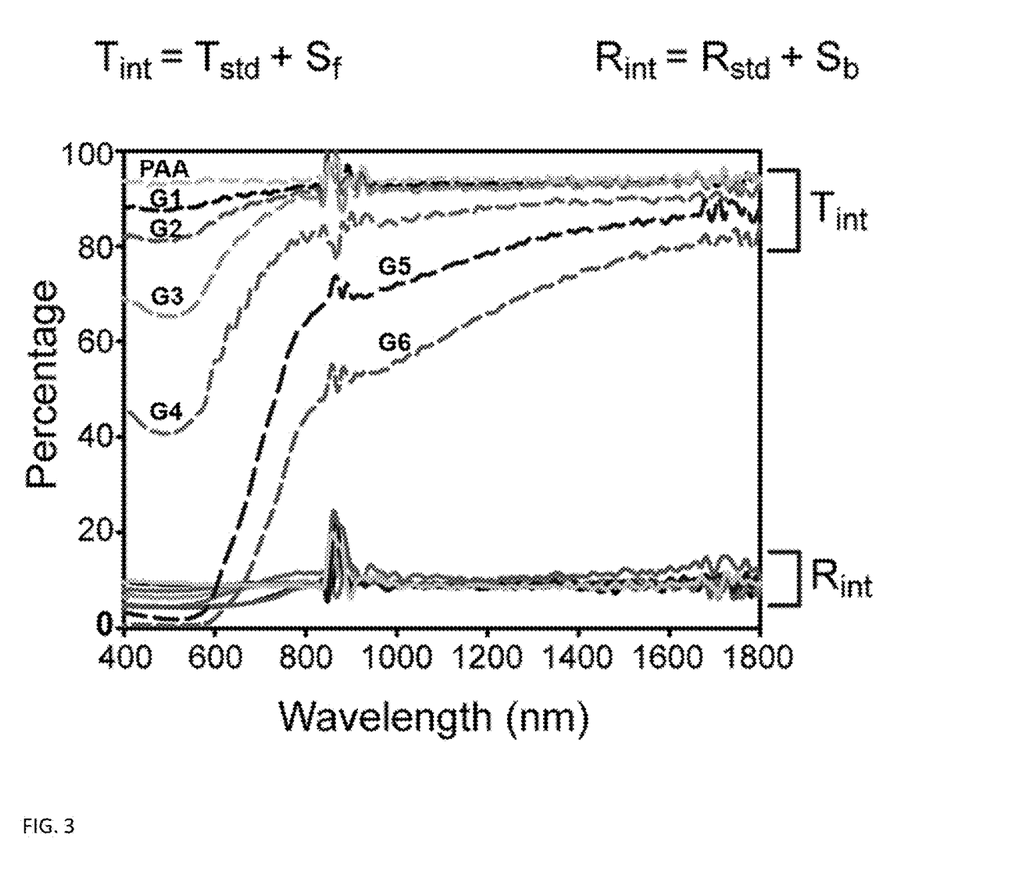
FIG. 3 provides a graph that illustrates the contributions of forward and back scattering to the total integrated transmission ($T_{int}$) and reflectivity ($R_{int}$) from the granule films of FIGS. 1 and 2. Specular transmission ($T_{std}$) and reflectance ($R_{std}$) can be calculated from the measured forward ($S_f$) and back scattering ($S_b$).

Using the versatility of TIDS, it was possible to directly measure both forward ($S_f$) and backward ($S_b$) scattering light and use these values to extrapolate the specular transmission ($T_{std}$) and reflection ($R_{std}$) within all films (see equations in FIG. 3, and see R. M. Osgood III, K. M. Bullion, S. A. Giardini, J. B. Carlson, P. Stenhouse, R. Kingsborough, V. Liberman, L. Parameswaran, M. Rothschild, O. Miller, S. Kooi, J. Joannopoulos; F. Jeffrey, S. Braymen, H. Singh Gill, J. Kumar, *Proc. SPIE* 9178, Next Generation Technologies for Solar Energy Conversion V 2014, 917801). As with $T_{int}$, a shift in $S_f$ dependent on film thickness (see FIG. 4), where the thicker films exhibited peaks in $S_f$ at longer wavelength was observed. For the thinner sample (G2), $S_f$ was lower (<20%) across the visible through SWIR range, suggesting lower interaction cross-sections in these sub-monolayer films, hence higher primary beam transmission. Interestingly, as the film thickness was maximized (G6), forward scattering in the visible was no longer detected at λ<550 nm likely due to more absorption in these films; instead, a phase-shift leading to a ~42% increase in forward scattered light in the SWIR range was observed (see FIG. 4, G6).

Figure 4:
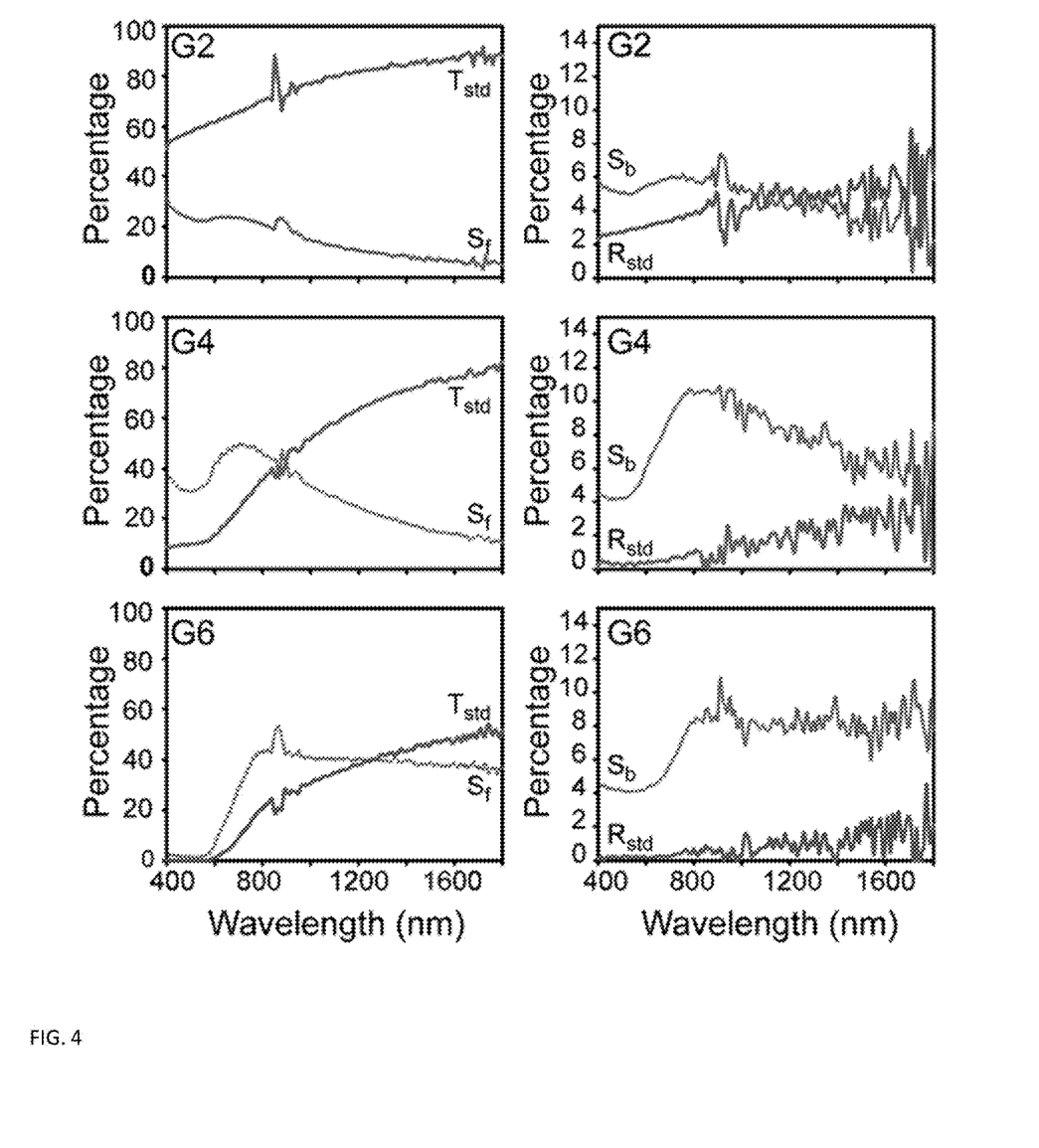
FIG. 4 provides graphs illustrating the integrated scattering from the G2, G4, and G6 films representing a distribution in select film thicknesses and inter-granular spacings. Representative spectra of (i) the $S_f$ (dashed lines) and $T_{std}$ (solid lines) and (ii) $S_b$ (dashed lines) and $R_{std}$ (solid lines) in the G2, G4, and G6 films.

When the effects associated with backward scattering were isolated from the total integrated reflectance ($R_{int}$), the specular reflectivity ($R_{std}$) became almost featureless, decreasing to –3% (for G2) and –0% (for G4 and G6) in the visible range. On the other hand, Sb retained the original shape of the $R_{int}$ spectrum, indicating that most of the total reflected light was due to back-scattering from the films (FIG. 4). Collectively, based on these observations it is believed that scattering is the major contributor to the reflected color. Furthermore, it was found that the thicker samples (G4 and G6) appear to have a higher scattering cross-section than the sub-monolayer film (G2), where much of the light passes unscattered through the sample.

Figure 5:
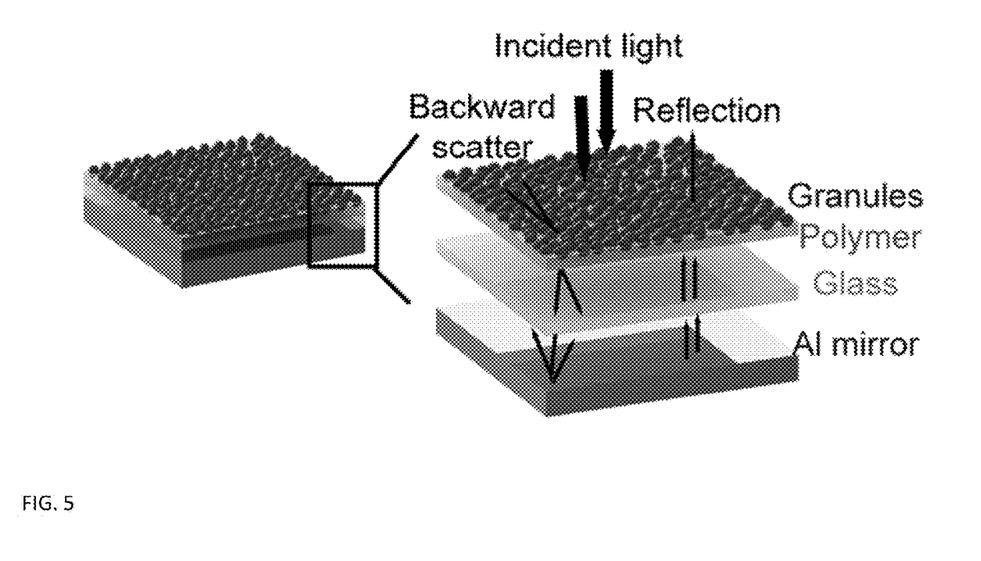
FIG. 5 provides an illustration of a film designed to mimic the squid dermal tissue with granule material layered on top of the back-reflector (Al-mirror). The exploded view represents how reflected and backward scattered light can potentially be amplified in the presence of the back-reflector.
Figure 6:
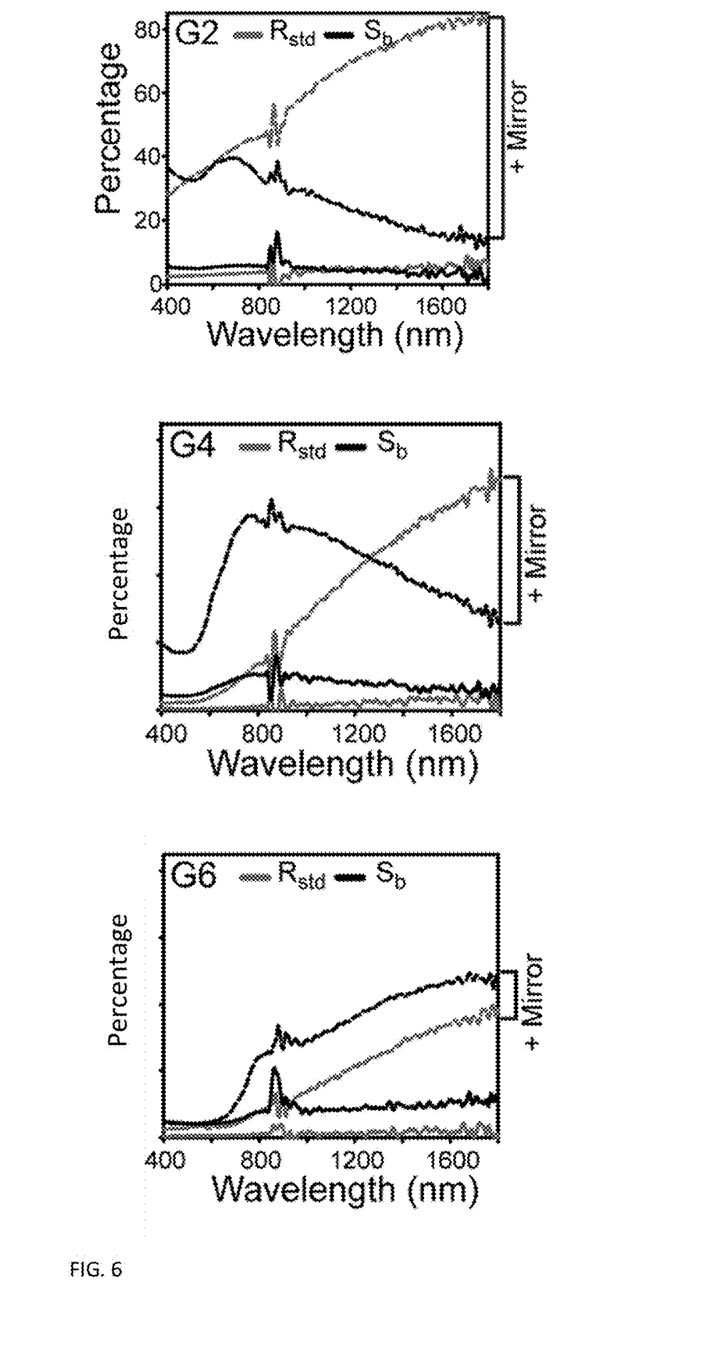
FIG. 6 provides graphs showing that forward scatter enhances visible color reflected from pigment granules in a monolayer film, G2; a multi-layer film, G4; and a saturated film, G6 measured with an Al-back-reflector; The dashed lines represent the data with the Al-mirror (Labeled as +Mirror), and the solid lines are the TIDS data collected without the Al-mirror.

Based on these findings, it was hypothesized that both forward and backward scattering facilitate light penetration to and from the underlying iridophore organs, leading to color enhancements in the squid skin during camouflage. To test this, an experiment was designed to recapitulate squid dermal tissue. A highly reflective aluminum (Al) mirror was placed underneath the granule films (see FIG. 5 for an example mimetic film) and $R_{std}$ and $S_b$ measured (see FIG. 6). The Al-mirror was chosen as it reflects >90% light with ~0% back-scattering across the visible and SWIR regions. Using this design, an increase in % $R_{std}$ with the back-reflector mirror was observed. An increase in % $S_b$ was also observed, which was likely due to the high $S_f$ values of the granules (see FIG. 6). For the thinner films (G2), a >30% increase was observed in both specular reflectivity and back-scattering across the visible and SWIR regions with the Al-mirror. For the thicker samples (G4 and G6), effects of % $R_{std}$ were not as significant in the visible, suggesting that in these denser form factors, light has a higher probability to be reabsorbed by the pigment granules, resulting in a minimal change in the visible region but a larger deviation in the SWIR region. Combined, these data indicate a method to enhance the reflected and scattered color from chromatophore pigment granules, even when they are only 1 particle layer thick.

Given the large observed scattering from the chromatophore granules, experiments were conducted to identify its origin. Soluble pigments were extracted from the granules using the protocol of C. W. DiBona, T. L. Williams, S. R. Dinneen, S. F. Jones Labadie, L. F. Deravi, *J Vis Exp* 2016, 117, e54803, and T. L. Williams, C. W. DiBona, S. R. Dinneen, S. F. Labadie, F. Chu, L. F. Deravi, *Langmuir* 2016, 32, 3754 and films comprised of the pigment-extracted granules (devoid of color, particle diameters ~170 nm) and the pigment component (no granular form) fabricated. The films containing the pigment-extracted granules were opaque in color, transmitting ~90% light. They displayed ~5% and ~9% $S_b$ and $R_{int}$, respectively, along with an $S_f$ that decayed exponentially from 40 to 10% across the visible and SWIR regions. On the other hand, the pigment only film displayed a red color ($\lambda_{max}$~520 nm), transmitting <20% of light below 550 nm but increasing to 90% transmission in the NIR-SWIR regions. They also exhibited ~1-4% $S_b$ and $R_{int}$, with a small $S_f$ that approached 8% beyond 800 nm. Collectively, these data suggest that the pigment contributes to the absorptive properties of the granules; whereas, the remaining nanospherical "shell" of the extracted granules contributes to a notable $S_f$ in the visible region. However, both components are required to produce the unique profiles necessary for these granules to absorb and scatter light across both visible and SWIR regions.

Figure 7:
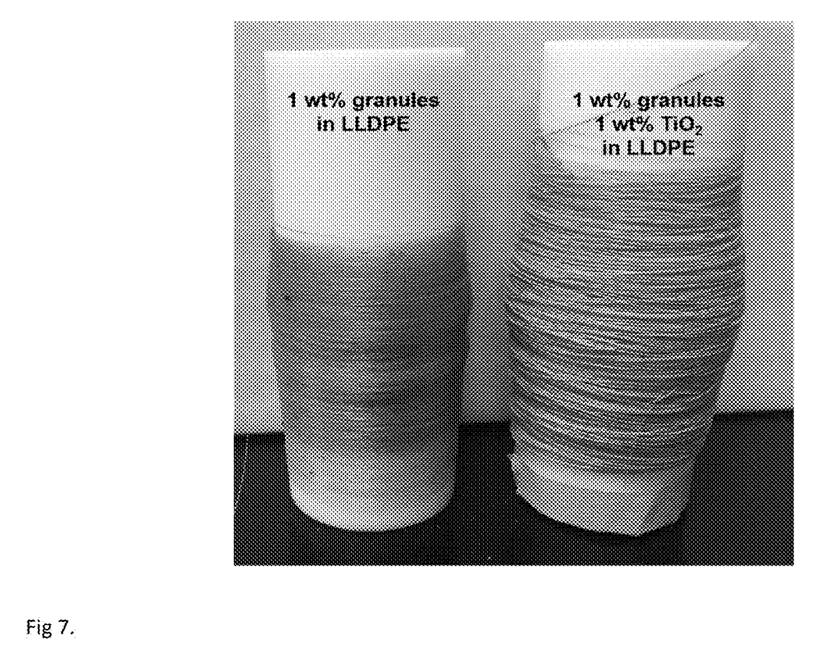
FIG. 7. is a photo of extruded polymer fibers containing scattering cephalopod granules in linear low-density polyethylene (LLDPE; left) and scattering cephalopod granules in LLDPE doped with titanium dioxide (right), both prepared using melt spinning. The fibers are shown on spools on which they were collected.
Figure 8:
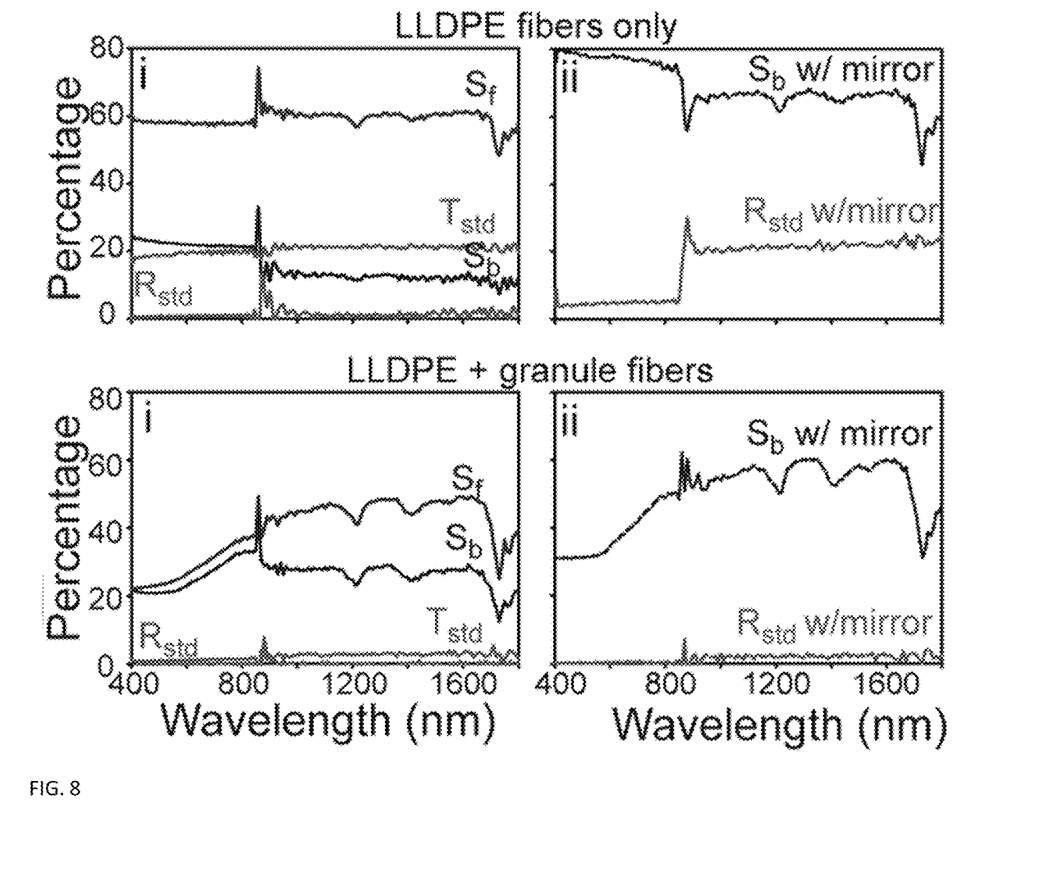
FIG. 8 provides graphs illustrating the results of TIDS measurements on fibers (no granules) suspended across a window without (i) and with (ii) an Al back-reflector mirror (top row), and TIDS measurements on granule containing fibers suspended across a window without (i) and with (ii) an Al back-reflector mirror (bottom row).

It was further investigated whether the inherent scattering of the granules could be used to enhance light reflected from materials other than thin films. Fibers were chosen for this investigation, as polymeric fibers are a central component to many technologies that require or are acquiring advanced optical functionality that could benefit from natural, environmentally-friendly optical materials. Granules were combined into the central core of polymer, melt-extruded fibers, to explore whether visible and infrared light could be straightforwardly manipulated in this simple, easily manufactured material platform. Fibers were fabricated by co-extruding the chromatophore pigment granules with linear low-density polyethylene (LLDPE) using melt spinning and the resultant fibers were collected on a rotating spool. LLDPE was chosen as polymer-carrier material due its thermal stability, chemical inertness, flexibility, and optical transparency. When incorporated with the LLDPE polymer during spinning, the resultant hybrid fibers were colored with an average diameter of 261±15 µm. At these sizes, it was difficult to discern individual granules; however, the granule-incorporated fibers were visibly different (FIG. 7). Under a microscopic visible-light spectrophotometer, the granule-incorporated fibers were dark and had an almost metallic appearance. To quantify this change in color, a multi-layer of diffuse fibers was aligned across an open holder and their optical properties measured using TIDS. The control LLDPE fibers were visibly clear and fairly transmissive, with absorption only in certain narrow regions of the NIR-SWIR (see FIG. 8, top left graph). Due the non-planarity of the fiber surface, much (but not all) of illuminating beam was converted into forward scattering or diffuse transmission, with negligible specular reflectivity (see FIG. 8, top left graph). In contrast, the fibers containing granules exhibited little transmission with reduced forward scattering in the visible regime, indicating a higher contribution to absorption in this region (see FIG. 8, bottom left graph). Furthermore, little specular reflectivity was observed again due to the diffuse reflectance from curved fiber surfaces. To determine whether it was possible to tune to the intensity of reflected light, as was done with the films as described above, next the Al back-reflector was employed behind the diffuse layer of fibers and $S_b$ and $R_{std}$ measured (see FIG. 8, top and bottom right graphs). With the back-reflector, the large forward scattering in the LLDPE fibers was converted to backscattering, exhibiting a similar spectral dependence of $S_f$ and $S_b$. The specular reflectivity also increased, possibly due to forward scattering rays being scattered back to near-normal incidence and/or gaps between fibers due to imperfect packing of the fibers that allowed some light to reflect directly from the mirror's surface (see FIG. 8, top left graph). A similar trend was observed with the hybrid fibers, where the (reduced in the visible but still significant) forward scattering was converted to backward scattering (see FIG. 8, top right graph); again, the $S_b$ and $S_f$ spectra were similar in shape. However, because the granules are more absorptive and stronger scatterers, and possibly also because of better packing, the specular reflectivity is enhanced by the back-reflector much less than for the pure LLDPE fibers. The experiments suggest a unique material that not only provides visible color but can also reflect color due to forward and backward scattering. Given its high scattering in the NIR and SWIR regions, these materials can be used in place of traditional IR-reflective colorants for wearable applications.

It has been found that the pigment granules contribute to nano-enabled scattering throughout the visible, NIR, and SWIR regions with a brightness that is dependent on the thickness of the particle layer and/or by combining a back-reflector with a specific band pass.

Synthetic Particles that Mimic Light-Scattering Squid Granules

Figure 9:
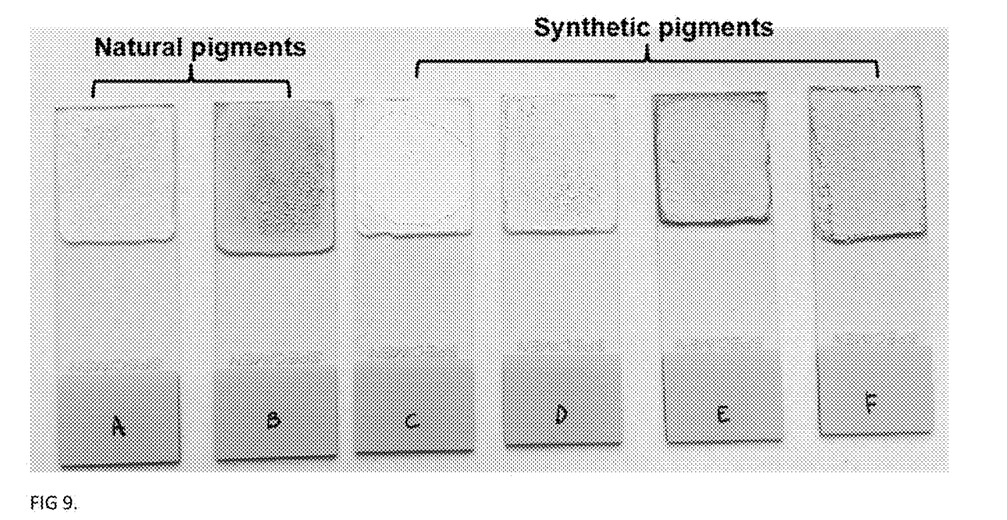
FIG. 9. is a photo of several coatings on glass slides (A to F). Primary amine rich dendrimer was used to encapsulate Xa in its various forms; the nanoparticles (NPs) were then dropcast onto glass slides to form textured coatings of varying hue. The As used herein, a "stabilizing material" refers to any substance that prevents the physical or chemical alteration of a second material and/or eliminates the breakdown of another compositional discrete substance.

Electrostatic interactions can be used to template nano- and micro-particle synthesis. For instance, we can use a generation 4 amine terminated dendrimer to control the size and abundance of precipitated silica nanoparticles from a hydrolyzed precursor, tetramethyl orthosilicate (TMOS). When combined in different molar ratios with the phenoxazone-based pigments, this synthesis allowed to build synthetic materials that recapitulate the nano- and micro-spherical structures with absorbance and scattering and color palettes similar to the natural chromatophore granules (FIG. 9).

Other polymers and other inorganic materials can be of interest (e.g., iron oxides, titanium dioxide, etc.). For instance, titanium (IV) bis(ammonium lactate) dihydroxide (TiBALDH) can be substituted for TMOS and used as a precursor solution to form pigmented-$TiO_2$ nanoparticles. Pigments can further be stabilized to generate multiple color hues when bound specifically to metal salts such as copper (III) sulfate and iron (III) chloride which can generate pink (in copper solution, which is normally faint blue) or green (in iron solution which is originally yellow in color).

Experimental Section

Materials: Squid *D. pealeii* were purchased from the Marine Biological Laboratories in Woods Hole, Mass. Artificial sea water, papain, collagenase, polyacrylic acid (M.W. 240,000, 25 wt % solution in water) were purchased from fisher scientific. 4-(2 hydroxyethyl)-1-piperazineethanesulfonic acid (HEPES), magnesium chloride ($MgCl_2$), DL-dithiothreitol (DTT) (99%), potassium aspartate (99%), protease inhibitor tablets were purchased from Sigma-Aldrich. A 6-mm thick aluminum mirror (1 inch×1 inch) (PFSQ05-03-F01) was purchased from Thorlabs, Inc.

Isolation of granules: Isolation of pigment-granules were performed using the method of C. W. DiBona, T. L. Williams, S. R. Dinneen, S. F. Jones Labadie, L. F. Deravi, *J Vis Exp* 2016, 117, e54803. Briefly, the dermal layer of the squid was removed manually, and the sub-dermal chromophore layer was collected. Tissue was digested using a combination of enzymes, and the granules were isolated using homogeneous buffer solution. A pure population of granules was retrieved after multiple washing and centrifugations steps.

Pigment extraction and isolation of post-extracted granules: Pigments were extracted from the purified, isolated granules using acidic methanol. This cycle was repeated until a colorless pellet was recovered. The extracted pigment and pigment-extracted granules were stored at 4° C. until use.

Pigment granule film preparation: 18 cm×18 cm glass slides were sonicated for 30 mins into isopropanol, ethanol and acetone prior to use. Once dried, a 8.3 wt/v % solution of polyacrylic acid (PAA) (pH 3.5) was dispensed on the glass surface and spun for 1 min at 2,000 rpm to obtain a uniform coating using a G3P-8 Spin Coater. Next, a granule-water suspension (concentration was varied from 0.16 mg to 2.45 mg per ml water) was drop-casted directly onto the PAA coated glass surface and dried at 70° C. for 1 hour, until the films were dried. For the pigment-extracted granules and the pigment-only films, a similar procedure was used make the films.

Fiber fabrication: Fibers were extruded using a DACA twin screw extruder. A 1 wt % of dried, lyophilized pigment granules was added in series to 2.9 g of linear low-density polyethylene (LLDPE) pellets and allowed to melt and mix for 4 min at 170° C. prior to extrusion. A 0.75 mm spinneret was added to the extruder to enable better size control on the formed fibers. Upon extrusion, the resultant fibers were attached and collected on a motorized spool. For the spectrophotometric studies, the fibers were manually wrapped around a holder such that a thin >0.5 mm distribution of fibers could be analyzed at a time. Once assembled, the wrapped fibers were cut such that only one layer were exposed to the incident beam during analysis.

Characterization: Spectral reflectance measurements were carried out using an Ocean optics spectrophotometer. A white standard reference (WS-1) was used before quantitative measurement of luminescence and color co-ordinates of each sample. A Hitachi S4800 scanning electron microscopy (SEM) was used for imaging the films. Thicknesses of the pigment and granule layers were measured using a DEK-TAK profilometer. Total integrated diffuse and specular scattering were measured using a Perkin-Elmer Lambda 900 spectrophotometer with an integrated sphere accessory. Prior to analysis, the instrument was auto-zeroed and the specular transmission of air was measured. For each film, the total integrated transmission ($T_{int}$) and forward scattering ($S_f$) were measured, and the specular transmission was calculated by subtracted $S_f$ from $T_{int}$. The total integrated reflectance ($R_{int}$) and backward scattering ($S_b$) were measured similarly used to calculate the specular reflectance. $S_b$ was measured by removing a specular light port from the integrating sphere. The zeta potential of the granules in water was measured using Malven Zetasizer nano-Z S90.

The teachings of U.S. Published Application No. 2015/0329604, titled: PIGMENT STRUCTURES, PIGMENT GRANULES, PIGMENT PROTEINS, AND USES THEREOF; and Int'l Application No. PCT/US2013/072311, titled: PIGMENT STRUCTURES, PIGMENT GRANULES, PIGMENT PROTEINS, AND USES THEREOF, now published as Int'l Publication No. WO 2014/085641, are incorporated by reference in their entirety.

The teachings of all patents, published applications and references cited herein, are incorporated by reference in their entirety.

While example embodiments have been particularly shown and described, it will be understood by those skilled in the art that various changes in form and details may be made therein without departing from the scope of the embodiments.

What is claimed is:

1. A composition comprising a solid, transparent and nondegradable matrix containing a plurality of synthetic particles having a size from about 1 to 100 microns, each synthetic particle consisting of:
   (i) one or more aggregates of a pigment selected from phenoxazone, phenoxazine, and a derivate or precursor thereof, and
   (ii) an inorganic or polymeric stabilizing material which has a refractive index larger than 1.45,
   the aggregates having a size larger than about 100 nm; and
   the solid, transparent and nondegradable matrix being a melt-processed polymer fiber,
   wherein the composition is not transparent.

2. The composition of claim 1, wherein the melt-processed polymer fiber contains the plurality of synthetic particles within the fiber.

3. The composition of claim 1, wherein the inorganic or polymeric stabilizing material is positioned between the aggregates to inhibit or prevent clumping of the aggregates.

4. The composition of claim 1, wherein each synthetic particle is polymer encapsulated.

5. The composition of claim 1, wherein the pigment is 3-hydroxykynurenine, xanthommatin, ommatin D, dihydroxy-xanthommatin, rhodommatin, or a derivative or precursor thereof.

6. The composition of claim 1, wherein the inorganic or polymeric stabilizing material is a metal, metalloid, metal oxide, polymer, or bare mineral.

7. The composition of claim 1, wherein the inorganic or polymeric stabilizing material is fluorphlogopite, borosilicate or silica.

8. The composition of claim 1, wherein the composition is capable of absorbing light having a wavelength of 280-2500 nm.

9. A sensor comprising the composition of claim 1, wherein the composition is positioned to allow physical contact with a sample; wherein the sensor responds to changes in pH, humidity, solar light and/or presence of chemical or electrical oxidizing or reducing agents in the sample.

10. The sensor of claim 9, wherein the composition changes its color in response to a sensed property of the sample.

11. A color-changing composition, comprising the composition of claim 1, the color-changing composition changing its color in response to changes in pH, humidity, solar light, and/or presence of chemical or electrical oxidizing or reducing agents.

12. A textile material comprising the composition of claim 1.

13. A coating comprising the composition of claim 1.

14. A film comprising the composition of claim 1.

15. The composition of claim 1, wherein the inorganic or polymeric stabilizing material is polyurethane, polyester, polyethylene glycol or polymethacrylate.

16. The composition of claim 1, wherein the melt-processed polymer fiber is formed by co-extruding the plurality of synthetic particles with polymer to form the melt-processed polymer fiber.

17. The composition of claim 16, wherein the polymer is linear low-density polyethylene, nylon, polyurethane, silk, or polyester.

18. A composition comprising a solid, transparent and nondegradable matrix containing a plurality of synthetic particles having a size from about 1 to 100 microns, each synthetic particle consisting of:
   (i) one or more aggregates of a pigment selected from phenoxazone, phenoxazine, and a derivate or precursor thereof, and
   (ii) an inorganic or polymeric stabilizing material which has a refractive index larger than 1.45,
   the aggregates having a size larger than about 100 nm, and
   the solid, transparent and nondegradable matrix being in the shape of a fiber,
   wherein the composition is not transparent.

* * * * *